United States Patent [19]

Zeenkov

[11] 3,868,478

[45] Feb. 25, 1975

[54] APPARATUS AND METHOD FOR SCANNING AND STORING INFORMATION LOCATED ON RAPIDLY MOVING ARTICLES

[75] Inventor: Michael N. Zeenkov, Potomac, Md.

[73] Assignee: Fairchild Industries Inc., Germantown, Md.

[22] Filed: Aug. 24, 1973

[21] Appl. No.: 391,364

[52] U.S. Cl. .............................. 178/6.8, 178/DIG. 1
[51] Int. Cl. .............................................. H04n 7/18
[58] Field of Search ................. 178/6.8, 7.2, DIG. 1; 340/146.3 H

[56] References Cited

UNITED STATES PATENTS

| | | | |
|---|---|---|---|
| 3,187,185 | 6/1965 | Milnes | 178/DIG. 1 |
| 3,246,126 | 4/1966 | Schlieben | 340/146.3 H |
| 3,674,924 | 7/1972 | Fischer | 178/6.8 |
| 3,758,723 | 9/1973 | Green | 178/DIG. 5 |

*Primary Examiner*—Howard W. Britton
*Attorney, Agent, or Firm*—Michael W. York

[57] ABSTRACT

An apparatus and method for scanning and storing addresses located on rapidly moving articles such as pieces of mail in which rapidly moving pieces of mail are passed over a transparent sheet and the upper and lower sides of the pieces of mail which have an address located on one side are subjected to illumination from short duration light pulses from a respective overhead strobe light and a lower strobe light. An overhead television camera views the upper sides of the moving pieces of mail and a lower television camera views the undersides of the moving pieces of mail which are illuminated by the strobe lights. The images of the upper and lower sides of the pieces of mail are temporarily stored in the respective overhead television camera and in the lower television camera. These images are then conveyed to separate television storage units and they are displayed on the screens of separate closed circuit television monitoring units to permit an operator to read the addresses. Various controls are provided for manipulating the image on the screen of the closed circuit television monitors to permit the more accurate viewing of the addresses.

14 Claims, 5 Drawing Figures

APPARATUS AND METHOD FOR SCANNING AND STORING INFORMATION LOCATED ON RAPIDLY MOVING ARTICLES

BACKGROUND OF THE INVENTION

At the present time, all of the addresses on parcels and all of the addresses on handwritten letters which are handled by the United States Postal Service are read exclusively by the naked eye. It would be highly desirable to process and read the addresses on a large volume of rapidly moving pieces of such mail to determine their proper destinations. Unfortunately, the addresses on rapidly moving pieces of mail cannot be read by the human eye, since to a human eye any address would merely appear as a blurred image. Of course, the rapidly moving stream of mail could be slowed down or stopped to permit the addresses to be read by the naked eye. However, this would be counterproductive and would not permit large volumes of mail to be directed to their destinations in an efficient and economical manner. These letters and parcels must also normally be positioned and have their addresses facing in an upward direction or in a direction facing towards the viewer. As a consequence, the distribution of these types of mail proceeds at a comparatively slow rate. It is thus also important from the standpoint of speed and economy to reduce the amount of such preprocessing that is necessary before an address on a piece of mail is read since the facing and positioning of mail is time consuming and costly. In addition, it may even be impossible to face or position pieces of mail located in a rapidly moving stream of mail. In order to properly sort or distribute the rapidly moving pieces of mail, it is thus not only necessary to provide a readable image of the address on the pieces of mail that are moving rapidly but also to provide an image that an operator can read even though the pieces of mail may be unfaced and not positioned. It is also generally impractical to put more than one man on a moving stream of mail when the mail is being read with the naked eye and this seriously detracts from the efficiency which is obtainable with that type of system.

The present invention overcomes these disadvantages and provides an image that permits the address on a piece of mail in a high speed stream of unpositioned and unfaced mail to be read accurately and rapidly. This invention also permits several men to work efficiently on one stream of mail or permits one man to work on several streams of mail. Moreover, the invention can also be used with articles, other than pieces of mail, which need to be viewed.

BRIEF DESCRIPTION OF THE INVENTION

This invention relates to apparatus and methods for scanning information located on articles to be viewed and more particularly to apparatus and methods for scanning information located on articles to be viewed in which the information is to be read by the human eye.

It is an object of the present invention to provide an apparatus and method for viewing information on articles located in a rapidly moving stream of such articles.

It is an object of the present invention to provide an apparatus and method for viewing the addresses and the like located on rapidly moving articles such as pieces of mail and the like.

It is an object of the present invention to provide an apparatus and method for viewing the addresses on pieces of mail located in a stream of unfaced mail.

It is an object of the present invention to provide an apparatus and method which permits the addresses on pieces of mail located in a stream of unoriented or partially oriented mail to be viewed.

It is also an object of the present invention to provide an apparatus and method which permits addresses located on rapidly moving unpositioned or unoriented pieces of mail to be manipulated so that the addresses may be readily read.

It is also an object of the present invention to provide an apparatus and method for viewing information on rapidly moving articles in which the image of the information may be stored until needed.

It is also an object of the present invention to provide an apparatus and method for viewing information on rapidly moving articles in which noise signals associated with the image of the information are reduced.

It is also an object of the present invention to provide an apparatus and method for viewing addresses on rapidly moving pieces of mail in which one individual can view the images of the addresses on the pieces of mail located in a plurality of streams of rapidly moving mail.

It is also an object of the present invention to provide an apparatus and method for viewing addresses on rapidly moving pieces of mail in which a plurality of individuals can view the images of the addresses on the pieces of mail located in one stream of mail.

The present invention provides an apparatus for scanning and storing information located on rapidly moving articles to be viewed including means for detecting the presence of a rapidly moving article to be viewed and means activated by the detecting means for illuminating the rapidly moving article with a short duration flash of light. A television camera is also provided that has a vidicon tube for viewing and temporarily storing an image of the illuminated article and separate storage means is provided for storing the image of the illuminated article which has been temporarily stored in the vidicon tube. Means having a screen for monitoring the image stored in the separate storage means is also provided.

The present invention also provides a method for scanning and storing information located on rapidly moving articles to be viewed which includes the steps of sensing the presence of a rapidly moving article to be viewed, illuminating the article with a flash of light of very short duration after sensing the presence of the article, viewing the illuminated article with a television camera, temporarily storing the image of the illuminated article in the television camera for a period of time after the article is no longer illuminated by the flash of light, storing the image of the illuminated article which has been temporarily stored in the television camera in separate storage means to permit the television camera to view additional images, and monitoring the stored image which is present in the separate storage means.

BRIEF DESCRIPTION OF THE DRAWINGS

The invention will be hereinafter more fully described with reference to the accompanying drawings in which.

DETAILED DESCRIPTION OF THE PREFERRED EMBODIMENT

Figure 1:
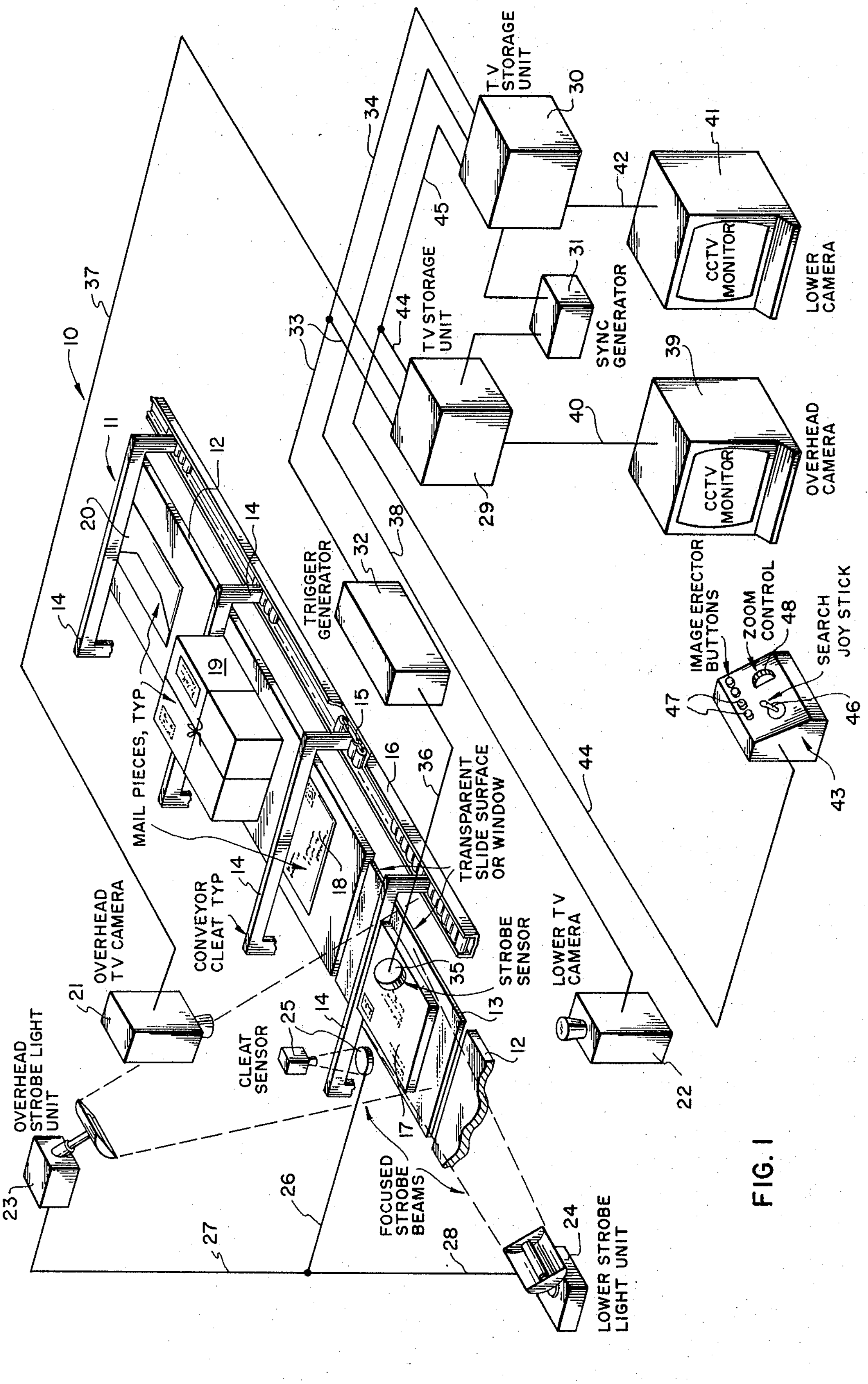
FIG. 1 is a perspective view of the apparatus for scanning and storing information located on rapidly moving articles of the present invention.

Referring first to FIG. 1 the apparatus for scanning and storing information located on rapidly moving articles of the present invention is illustrated and is generally designated by the number 10. The apparatus for scanning and storing information located on rapidly moving articles 10 comprises means for transporting the articles 11 which comprises a low friction slider bed 12, a transparent slide sheet or window 13 located between two portions of the bed, a plurality of spaced cleats 14, a conveyor chain 15 which is connected to one end of the cleats and another conveyor chain (not shown) connected to the other end of the cleats. As illustrated for the chain 15, each chain rides in a U-shaped channel such as the channel 16 which serves to guide and support the chain. As the chains such as the chain 15 are caused to be moved by means which are not shown, they cause the connected cleats 14 to be moved across the top of the upper surface of the bed 12 and these cleats engage various articles to be viewed such as the pieces of mail which are designated by the numbers 17, 18, 19 and 20 and they push the pieces of mail along the upper surface of the bed 12 and eventually onto the upper surface of the transparent window 13.

The apparatus for scanning and storing information located on rapidly moving articles 10 also comprises an overhead television camera 21 which is located above and is focused on the upper surface of the transparent sheet or window 13, a lower television camera 22 which is located below and is focused on the underside of the sheet 13, an overhead strobe light unit 23 located above the sheet 13 for illuminating the upper surface of the sheet and a lower strobe light unit 24 located below the sheet 13 for illuminating the underside of the sheet. Both of the television cameras 21 and 22 use vidicon type camera tubes which have a photo sensitive surface that permit an image to persist for a period of time which is well in excess of one television frame. A photo electric type cleat sensor 25 is also provided which detects the presence of a cleat 14 as a piece of mail is being pushed onto the upper surface of the transparent sheet or window 13 by the clear and the cleat sensor 25 provides a signal on the leads 26, 27 and 28 which activates the overhead strobe light unit 23 and the lower strobe light unit 24.

The apparatus for scanning and storing information located on rapidly moving articles 10 also includes two television storage units 29 and 30 which each have television storage tubes, an associated sync generator 31 which interconnects the two television storage units and provides the usual sync signals, a trigger generator 32 which is connected to the television storage units by the leads 33 and 34 and a strobe light sensor 35 which is connected to the trigger generator by the lead 36.

The strobe light sensor 35 detects a flash of light from the lower strobe light unit 24 and it transmits a signal on the lead 36 to the trigger generator 32. The trigger generator 32 in turn causes a signal to be transmitted on the leads 33 and 34 to the television storage units 29 and 30 which in turn causes the television storage unit 29 to receive the image from the vidicon tube in the overhead television camera 21 along the lead 37 and also causes the television storage unit 30 to receive the image from the vidicon tube in the lower television camera 22 along the lead 38.

The apparatus for scanning and storing information located on rapidly moving articles 10 also comprises an overhead camera monitor 39 which is connected to the television storage unit 29 by the lead 40, a similar lower camera monitor 41 which is connected to the television storage unit 30 by the lead 42, and an image control unit 43 which is connected to the television storage units 29 and 30 by the leads 44 and 45. The image control unit 43 has a joy stick 46 for controlling or manipulating the location of the stored image of the upper or lower side of a piece of mail which is located on the transparent sheet 13 and is projected on the screen of the overhead camera monitor 39 or the lower camera monitor 41. The image control unit 43 also has a zoom control knob 48 for controlling the size of the stored image of the piece of mail which is also painted or viewed on the screen of the overhead camera monitor 39 and the lower camera monitor 41. In addition, the image control unit 43 has image erecting buttons 47 for changing the orientation of the stored image which is also located in the screen of the overhead camera monitor 39 and the lower camera monitor 41 in order to permit any address contained in the image to be located in an upright position so that it is easily readable.

Figure 2:
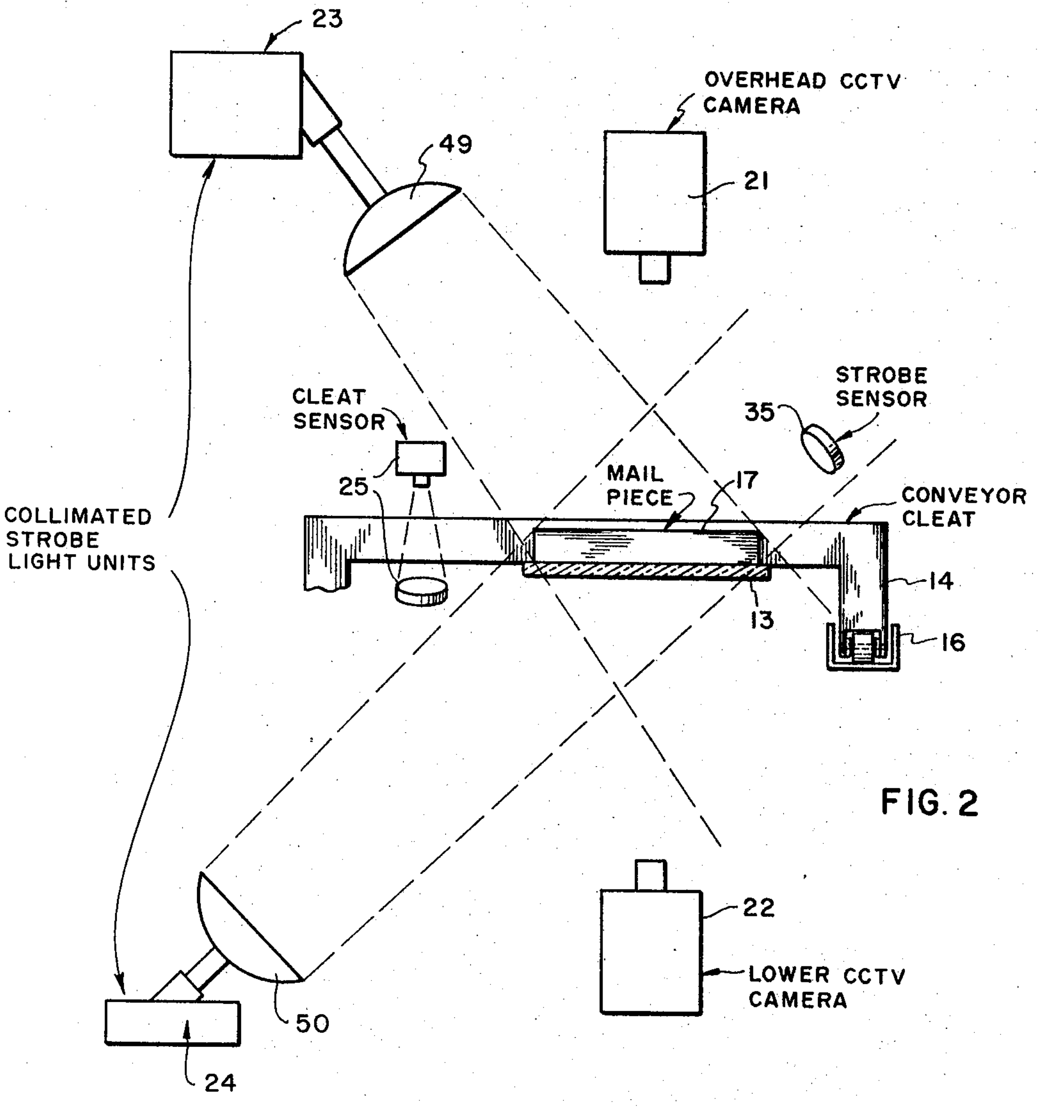
FIG. 2 is a front elevational view of a portion of the structure illustrated in FIG. 1.

The manner in which the overhead strobe light unit 23, the lower strobe light unit 24, the overhead television camera 21 and the lower camera 22 are located is best illustrated in FIG. 2. As illustrated, the overhead television camera 21 is located directly above the transparent sheet or window 13 so that it can readily view the upper surface of a piece of mail such as a piece of mail designated by the number 17 which is located on the transparent sheet. The lower television camera 22 is located directly below the transparent sheet 13 so that it can view the underside of a piece of mail such as a piece of mail designated by the number 17 which is located on the transparent sheet. The strobe light units 23 and 24 are located to the left and well out of the line of sight between the two television cameras 21 and 22 which are pointed toward each other. The stobe light unit 23 is also located considerably above the level of the transparent sheet 13 and the strobe light unit 24 is located considerably below the level of the sheet 13. The strobe light 23 has a reflector 49 for focusing and directing the light beam from its light downward at an angle so that it illuminates substantially only the under surface of the transparent sheet 13. In this manner, the reflector 49 also controls the light so that it does not impinge on the lens of the lower television camera 22. In a similar manner the lower strobe light unit 24 has a reflector 50 for focusing its light substantially only upon the lower surface of the sheet 13 and thus for also preventing its light from impinging upon the lens of the overhead television camera 21. The location of the overhead strobe light unit 23, the lower strobe light unit 24, including the positioning of their reflectors, with respect to the overhead camera 21 and the lower camera 22 are important since otherwise the television cameras could not properly view a piece of mail such as a piece of mail 17 located on the transparent sheet 13.

Figure 3:
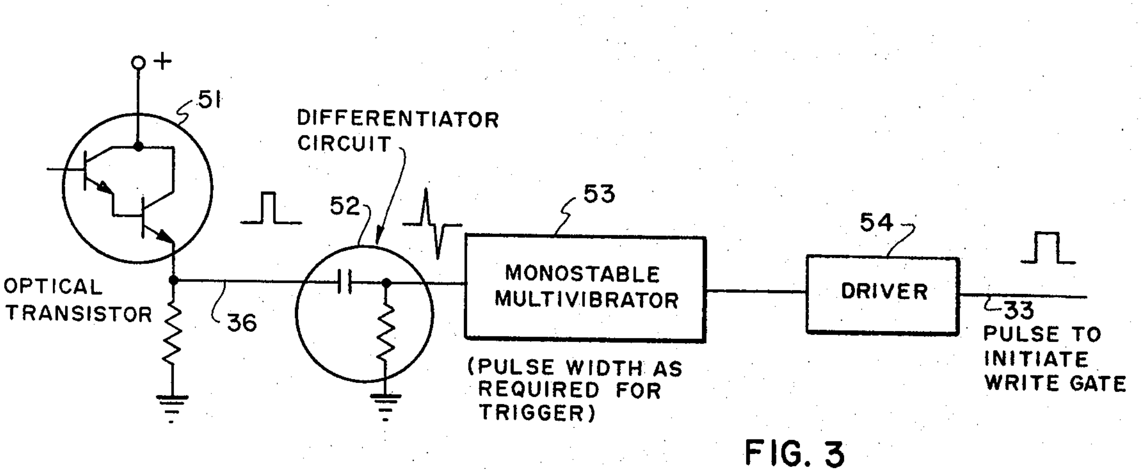
FIG. 3 is a circuit diagram of the strobe sensor and trigger generator circuit which forms part of the present invention.

The circuitry for the strobe sensor 13 and the trigger generator 32 are illustrated in FIG. 3. The strobe sensor 13 contains an optical transistor 51 which is connected to the differentiator circuit 52 located within the trigger generator 32 by the lead 36. The differentiator circuit 52 is in turn connected to the monostable multivibrator 53 which is in turn connected to a driver 54 which are both also contained within the trigger generator 32. The driver 54 is in turn connected to the lead 33 which goes to the previously described television storage units 29 and 30. When the lower strobe light unit 24 is activated, light impinges upon the optical transistor 51 located in the strobe sensor 13 and as a result a rectangular wave pulse signal is transmitted along the lead 36 to the differentiator circuit 52. The differentiator circuit 52 in turn develops positive and negative pulses at the leading and trailing edges of the incoming rectangular pulse and either one of these pulses can then be used to trigger the monostable multivibrator 53. The pulse width of the resulting pulse from the monostable multivibrator 53 is then amplified by the driver 54 to the level necessary to initiate a write gate located in the television storage units 29 and 30 to cause images located on the tubes of the cameras 21 and 22 to be entered into the respective storage units.

The write gates in the television storage units 29 and 30 may be adjustable in width or time to permit the writing time of the video, temporarily stored in the vidicon, to increase from one frame to several frames. This enhances the video stored in the television storage units 29 and 30 by integrating the wanted video signal whereas random noise which would not appear at fixed positions in the field of the picture is not enhanced. Consequently, the image of a letter or other article is reinforced and the effect of random noise associated with the image is reduced.

Figures 4A, 4B:
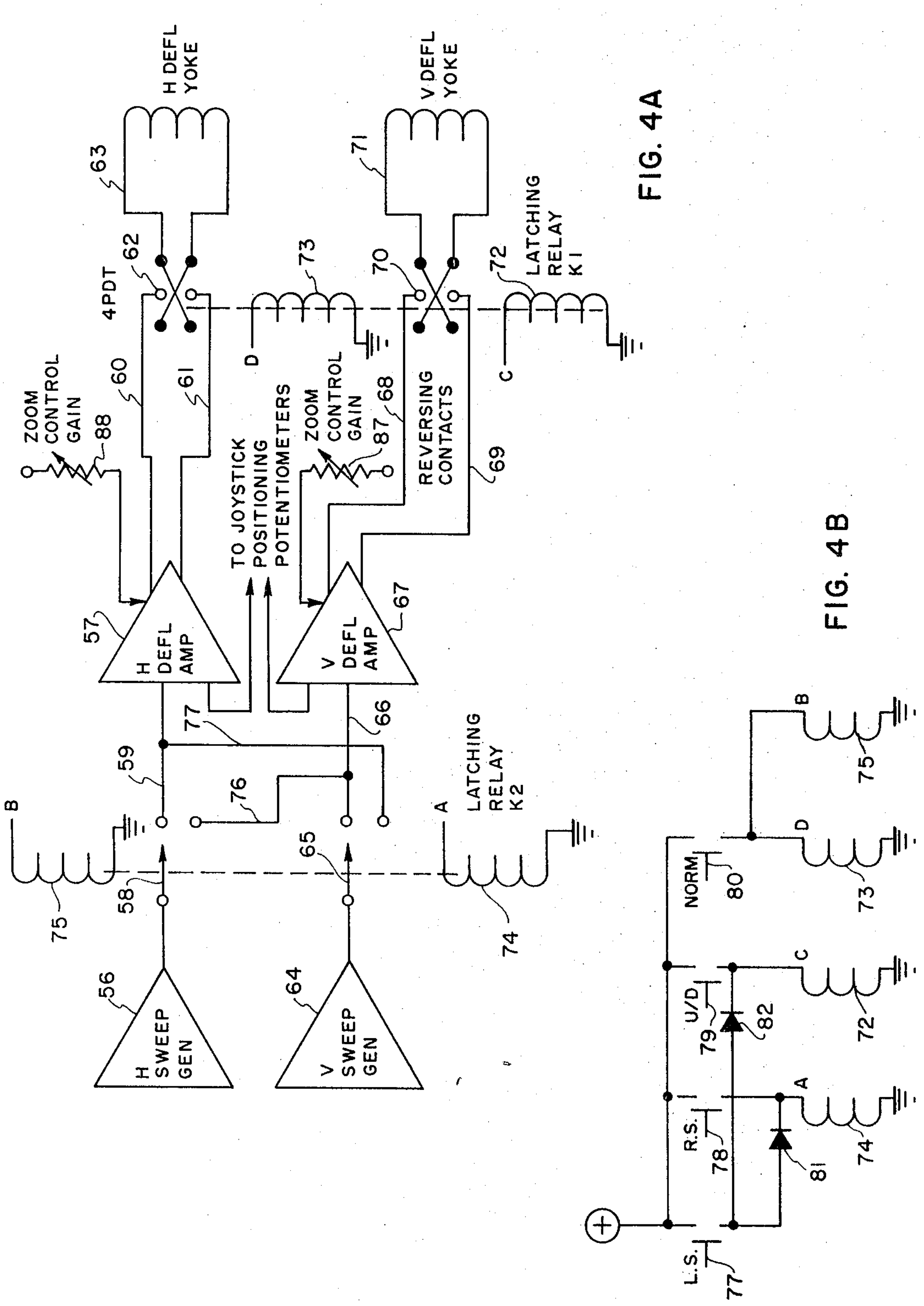
FIG. 4A and 4B are circuit diagrams of the image control circuit of the present invention.

The circuitry associated with the image control unit 43 is illustrated in FIGS. 4A and 4B. It should be noted that FIGS. 4A and 4B include circuitry which would be located in the overhead storage unit 29 and the lower storage unit 30. As illustrated in FIG. 4A, the horizontal sweep generator 56 of the storage units 29 and 30 is normally connected to the horizontal deflection amplifier 57 through the contact 58 of the latching relay K2 and the lead 59. The horizontal deflection amplifier 57 is in turn connected by the leads 60 and 61 and reversing contact 62 of the latching relay K1 to the horizontal deflection yoke 63 of the storage tube of the storage unit 29 or 30. In a similar manner, the vertical sweep generator 64 is connected to the vertical deflection amplifier 67 by the contact 65 and the lead 66. The vertical deflection amplifier 67 is in turn connected by the leads 68 and 69 and the reversing contact 70 to the vertical deflection yoke 71 of the storage tube of the storage unit 29 or 30.

Activation of the coil 72 of the latching relay K1 will cause activation of the reversing contacts 62 and 70 and this reverse the input to the horizontal deflection yoke 63 and the vertical deflection yoke 71. In a similar manner the activation of the latching relay K2 will cause activation of the coil 74 and cause the horizontal sweep generator 56 to be connected to the vertical deflection amplifier 67 through the contact 58, the lead 76 and the lead 66, and also cause the vertical sweep generator 64 to be connected to the horizontal deflection amplifier 57 through the contact 65, the lead 77 and the lead 59. If the latching relay K1 is then activated, it will cause activation of the reversing contacts 62 to return the circuit associated with the vertical and horizontal deflection yokes to its original state. In the same manner, if the latching relay K2 is then activated, it will cause activation of the coil 75 to return the circuitry associated with the sweep generators and the deflection amplifiers to its original state. It should also be noted in FIG. 4A that the vertical deflection amplifier 67 and the horizontal deflection amplifier 57 are both connected to the respective potentiometers 87 and 88 associated with the zoom control knob 48 and to the respective positioning potentiometers (not shown) of the joy stick 46.

FIG. 4B illustrates the circuitry of the image control unit 43 which is associated with the image erector control buttons 47 and also the coils 72 and 73 of the latching relay K1 and 74 and 75 of the latching relay K2. As illustrated in FIG. 4B, one side of all of the buttons L.S., R.S., U/D and NORM which are respectively numbered 77, 78, 79 and 80, are connected to a source of positive potential. The designations L.S., R.S., U/D and NORM stand respectively for left side, right side, upside down and normal and refer to the way the image, which displays an address on a piece of mail, is located on either the screen of the overhead camera monitor 39 or on the screen of the lower camera monitor 41. If the image on either one of these camera monitors 39 or 41 is facing to the left side, then the L.S. button or button number 77 is pressed and this will cause a signal to be transmitted through the diode 81 to the coil 74 of the latching relay K2 and a signal to be transmitted through the diode 82 to the coil 72 of the latching relay K1 so that both the relays K1 and K2 are activated. Activation of the latching relay K1 will cause activation of the reversing contacts 70 and 62 so that the contacts are reversed to the vertical deflection yoke 71 and to the horizontal deflection yoke 63. Activation of the latching relay K2 will cause the horizontal sweep generator 56 to be connected to the vertical deflection amplifier 67 through the contact 58 and the leads 76 and 66 and will also cause the vertical sweep generator 64 to be connected to the horizontal deflection amplifier 57 through the contact 65, the lead 77 and the lead 59. As a consequence, the image of the address which had been facing to the left will now be erected so that it can be easily read.

If the image which has the address is facing to the righthand side, then the button 78 or R.S. button will be depressed and this will cause a signal to be transmitted to the coil 74 of the relay K2 to cause activation of the relay K2. As previously indicated, activation of the relay K2 will cause the horizontal sweep generator 56 to be connected to the vertical deflection amplifier 67 through the contact 58, the lead 76 and the lead 66 and will also cause the vertical sweep generator 64 to be connected to the horizontal deflection amplifier 57 through the contact 65, the lead 77 and the lead 59. As a consequence, the address in the image which was facing to the righthand side will not be in a right side up position. If the address in the image on the screen of the monitor 39 or 41 was upside down, then the U/D button or button number 79 would be depressed and this would cause a signal to be transmitted to relay coil 72 of the relay K1 to cause activation of that relay. Activation of the latching relay K1 will cause the reversing contacts 62 and 70 to reverse the leads to the horizontal deflection yoke 63 and the vertical deflection yoke 71 and this causes the image on the screen of the monitor to be inverted. Should it be desired to return the circuit to its orginal position the NORM button or button number 80 is depressed and this transmits a signal to the coil 73 of the latching relay K1 and to the coil 75 of the latching relay K2 which unlatches both of these relays and returns the circuit to its original condition.

The apparatus for scanning and storing addresses on rapidly moving pieces of mail 10 is utilized in the method of this invention to carry out in the following manner. Articles having information to be viewed such as pieces of mail designated by the numbers 17, 18, 19 and 20 are placed on the upper surface of the low friction slider bed 12 and they are caused to be rapidly moved along this surface by the moving cleats 14. The moving cleats 14 push the pieces of mail in turn onto the transparent sheet or window 13 as illustrated for the piece of mail designated by the number 17. As a cleat 14 pushes the piece of mail onto the sheet 13, the cleat sensor 25 detects the presence of the cleat and hence the piece of mail and transmits a signal to the overhead strobe light unit 23 and to the lower strobe light unit 24. This signal causes the overhead strobe light unit 23 and the lower strobe light unit 24 to be activated to respectively each emit a very short pulse of light which illuminates the upper surface of the piece of mail 17 and also the lower surface of that piece of mail. At the same time, the overhead television camera 21 will be viewing the illuminated upper surface of the piece of mail 17 and the lower television camera 22 will be viewing the lower illuminated surface of the piece of mail 17. The intense strobe light illumination of the upper and and the lower surfaces of the piece of mail 17 causes the image of the piece of mail to persist on the photosensitive surface of the vidicon camera tube which is located in each of the television cameras 21 and 22. The images will persist on the camera tube for a period well in excess of the duration of one television frame which is approximately 33 milliseconds and for a period of time after the piece of mail 17 is no longer illuminated.

The intense light from the lower strobe light unit 24 is also detected by the strobe light sensor 35 and a signal is transmitted on the lead 36 from the strobe sensor to the trigger generator 32. The trigger generator 32 in turn transmits a pulse along the leads 33 and 34 to the television storage units 29 and 30. This signal causes the television storage unit 29 to receive the image from the overhead television camera 21 along the lead 37 and also causes the television storage unit 30 to receive the image from the lower television camera 22 along the lead 30. The image of the upper surface of the piece of mail 17 which is view by the overhead television camera 21 is thus stored in the storage tube within the television storage unit 29 and the image of the lower surface of the piece of mail 17 which is viewed by the lower television camera 22 is thus stored in a similar storage tube within the television storage unit 30 and both television cameras 21 and 22 are then available to view additional pieces of mail.

The image of the upper side of the piece of mail 17 which is stored in the storage tube of the television storage unit 29 is also transmitted along the lead 40 to the overhead television camera monitor 39 where it is displayed upon its screen. In a similar manner, the image of the lower side of the piece of mail 17 which is stored in the storage tube of the television storage unit 30 is also transmitted along the conductor 42 to the television monitor 41 where it is displayed upon its screen. Since, as illustrated in FIG. 1, the piece of mail 17 has its address facing upward, the image which contains this address will be located on the screen of the overhead television camera monitor 39 and this is the screen that an operator would look at in order to read the address on the piece of mail. After the operator has read the address in the image on the screen of the overhead television monitor 39, he can then direct the piece of mail 17 to its correct destinations through the use of other conventional equipment which is not shown and which is not a part of the present invention.

If the image on the screen of the television monitor 39 was too small to permit the address to be rapidly read, the operator could utilize the zoom control knob 48 to enlarge the image so that the address could easily be read. In a similar manner, if the image was facing to the left on the overhead camera monitor screen which would be the case for instance for the piece of mail 18, the operator could push the appropriate image erector control button 47 to rotate or erect the image on the screen of the overhead television monitor 39. The appropriate image for the erector control buttons 47 would also be pushed in the event that the image on the screen of the overhead television monitor 39 was facing to the right or was inverted. In addition to the foregoing, if the image on the screen of the overhead television camera monitor 39 was located away from the central portion of the screen the operator could use his joy stick 46 to bring the image of the piece of mail into the central portion of the screen where it can be more easily read.

In case the address on the piece of mail is facing downward which would be the case for the piece of mail designated by the number 20, then the image of the address would appear on the screen of the lower television camera monitor 41 and the operator will view the address upon that screen. The operator can also use the joy stick 46, image erector control buttons 47, and the zoom control knob 48 of the image control unit 43 to control the location of the position of the image on the screen of the lower television camera monitor 41 in the same manner as previously described in relation to the overhead television camera monitor 39.

It will, of course, be appreciated that if in the event that the pieces of mail such as the pieces of mail 17, 18, 19 and 20 had been placed on the bed 12 with their addresses all facing in an upward position, it will not be necessary to utilize the lower strobe light unit 24, the lower television camera 22, the storage unit 30, and the lower camera television monitor 41. In this situation, the strobe sensor 35 would also be positioned to detect the light from the overhead strobe light unit 23. If the addresses on the pieces of mail are also properly oriented and the pieces of mail are properly located, the image erector control buttons 47 can be dispensed with and so can the search joy stick 46. In addition, if the addresses are of sufficient size and clarity then it will not be necessary to utilize a zoom control knob 48.

The apparatus for scanning and storing information on rapidly moving articles 10 can readily be used to permit one operator to view information such as addresses and the like located on articles such as mail and the like moving in several streams of such articles or it can be readily used to permit several operators to view information located on articles moving in a single stream of such articles.

Although the invention has been described in considerable detail with reference to a certain preferred embodiment, it will be understood that variations or modifications may be made within the spirit and scope of the invention as defined in the appended claims.

What is claimed is:

1. Apparatus for scanning and storing information located on rapidly moving articles to be viewed comprising:

means for detecting the presence of a rapidly moving article to be viewed;

means activated by said detecting means for illuminating the rapidly moving article with a short duration flash of light;

a television camera having a vidicon tube for viewing and for temporarily storing an image of the illuminating article;

separate storage means for receiving and storing the image of the illuminated article which has been temporarily stored by the vidicon tube of said television camera, said separate storage means having means for enhancing the imaging received from said television camera while not enhancing random noise associated with the image; and monitoring means having a screen for displaying the enhanced image stored in said separate storage means.

2. The apparatus of claim 1 further comprising transparent supporting means comprising a transparent sheet member for supporting the rapidly moving article and for permitting the underside of the fast moving article to be viewed through the transparent sheet member, second means activated by said detecting means for illuminating the underside of the fast moving article through said transparent sheet member with a short duration flash of light, a second television camera having a vidicon tube for viewing and for temporarily storing an image of the underside of the illuminated article, separate storage means for receiving and storing the image of the illuminated underside of the article which has been temporarily stored in the vidicon tube of the second television camera, said separate storage means having means for enhancing the image received from said second television camera while not enhancing random noise associated with the image, and monitoring means having a screen for displaying the enhanced underside image stored in said underside image storage means.

3. The apparatus of claim 1 wherein said separate storage means has a write gate and said means for enhancing the image received from said television camera while not enhancing random noise associated with the image comprises means for increasing the writing time associated with said write gate to that associated with a plurality of frames.

4. The apparatus of claim 3 further comprising means associated with said monitoring means for permitting an operator to manipulate the image displayed on the screen of said monitoring means for more accurate viewing of the image.

5. The apparatus of claim 4 including horizontal and vertical sweep generators and horizontal and vertical deflection yokes associated with the screen of said monitoring means and wherein said means for manipulating the image displayed on the screen of said monitoring means comprises means for altering the interconnections between said horizontal and vertical sweep generators and the horizontal and vertical deflection yokes.

6. The apparatus of claim 4 wherein said manipulating means comprises means for increasing the size of at least a portion of the image on the screen of said monitoring means.

7. The apparatus of claim 4 wherein said manipulating means comprises means for inverting the image on the screen of said monitoring means.

8. A method of scanning and storing information located on rapidly moving articles to be viewed comprising the steps of:

sensing the presence of a rapidly moving article to be viewed;

illuminating the rapidly moving article with a flash of light of very short duration after sensing the presence of the article;

viewing the illuminated article with a television camera;

temporarily storing the image of the illuminated article in the television camera for a period of time after the article is no longer illuminated by the flash of light;

storing the image of the illuminated article which has been temporarily stored in the television camera in separate storage means to permit the television camera to view additional articles;

during the process of storing the image of the illuminated article in the separate storage means, enhancing the image of the illuminated article while reducing the effect of the random noise associated with the image by storing a plurality of viewed image frames; and monitoring the stored enhanced image which is present in said separate storage means by viewing the image on a screen.

9. The method of claim 8 wherein said step of illuminating the rapidly moving article comprises illuminating the underside of the article through a transparent sheet with a flash of light of very short duration and wherein the step of viewing the illuminated article with a television camera comprises viewing the underside of the article through the transparent sheet as the underside of the article is being illuminated through the transparent sheet with a flash of light of very short duration.

10. The method of claim 8 wherein the step of monitoring the stored image which is present in said separate storage means comprises the step of manipulating the image stored in said separate storage means to permit more accurate viewing of said image.

11. The method of claim 10 wherein said step of manipulating the image stored in said separate storage means comprises shifting the location of the stored image on the screen upon which the image is being monitored.

12. The method of claim 10 wherein said step of manipulating the image stored in said separate storage means comprises increasing the size of at least a portion of the image.

13. The method of claim 10 wherein said step of manipulating the image stored in said separate storage means comprises erecting the image from a side facing position.

14. The method of claim 10 wherein said step of manipulating the image stored in said separate storage means comprises inverting the image.

* * * * *